(12) United States Patent
Harrington

(10) Patent No.: US 8,587,667 B2
(45) Date of Patent: Nov. 19, 2013

(54) BEYOND FIELD-OF-VIEW TRACKED OBJECT POSITIONAL INDICATORS FOR TELEVISION EVENT DIRECTORS AND CAMERA OPERATORS

(75) Inventor: Nathan J. Harrington, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 2219 days.

(21) Appl. No.: 11/774,660

(22) Filed: Jul. 9, 2007

(65) Prior Publication Data

US 2009/0015677 A1    Jan. 15, 2009

(51) Int. Cl.
*H04N 5/225*    (2006.01)

(52) U.S. Cl.
USPC ..................... 348/172; 348/E5.022

(58) Field of Classification Search
USPC .................... 348/172, E5.022, E5.024, E5.02
See application file for complete search history.

(56) References Cited

U.S. PATENT DOCUMENTS

| | | | |
|---|---|---|---|
| 6,229,550 B1 | 5/2001 | Gloudemans et al. | |
| 6,266,100 B1 | 7/2001 | Gloudemans et al. | |
| 6,404,455 B1* | 6/2002 | Ito et al. | 348/169 |
| 6,542,621 B1 | 4/2003 | Brill et al. | |
| 6,597,406 B2 | 7/2003 | White et al. | |
| 6,661,450 B2 | 12/2003 | Yata | |
| 6,687,386 B1* | 2/2004 | Ito et al. | 382/103 |
| 6,724,915 B1 | 4/2004 | Toklu et al. | |
| 6,744,403 B2 | 6/2004 | Milnes et al. | |
| 6,819,778 B2 | 11/2004 | Kamei | |
| 6,867,799 B2 | 3/2005 | Broemmelsiek | |
| 6,965,397 B1 | 11/2005 | Honey et al. | |
| 7,036,436 B2 | 5/2006 | MacDonald et al. | |
| 7,038,709 B1 | 5/2006 | Verghese | |
| 7,113,616 B2 | 9/2006 | Ito et al. | |
| 7,127,998 B2 | 10/2006 | MacDonald et al. | |
| 2003/0103139 A1* | 6/2003 | Pretzer et al. | 348/143 |
| 2005/0285941 A1* | 12/2005 | Haigh et al. | 348/155 |
| 2006/0193509 A1* | 8/2006 | Criminisi et al. | 382/154 |
| 2008/0310677 A1* | 12/2008 | Weismuller et al. | 382/103 |

* cited by examiner

*Primary Examiner* — Yasin Barqadle
(74) *Attorney, Agent, or Firm* — Yudell Isidore Ng Russell PLLC

(57) ABSTRACT

A system and method for implementing beyond field-of-view tracked object positional indicators for television event directors and camera operators. The present invention includes a camera having a field-of-view. The camera tracks an off-screen object. A coordinate manager blends an on-screen indication of distance that the object is away from said field-of-view. The camera is positioned to avoid the object in the field-of-view.

9 Claims, 4 Drawing Sheets

BEYOND FIELD-OF-VIEW TRACKED OBJECT POSITIONAL INDICATORS FOR TELEVISION EVENT DIRECTORS AND CAMERA OPERATORS

BACKGROUND OF THE INVENTION

1. Technical Field

The present invention relates in general to the field of data processing systems. More particularly, the present invention relates to the field of tracking data processing systems.

2. Description of the Related Art

As is well-known in the art, when a director instructs a camera operator to track the position of an object that is out of the field-of-view, audio messages must be passed between camera operators to indicate the approximate location of the object to be tracked. For live-television event directors, the current approach is to search various displays that correspond to simultaneously operating cameras. Once the live-television event director has found the object to be tracked, the live-television event director must manually select the alternate camera's view. Conversely, live-television event directors must constantly be tracking the existing output of cameras to ensure that objects not desired to be displayed do not appear in view.

SUMMARY OF THE INVENTION

The present invention includes a system and method for implementing beyond field-of-view tracked object positional indicators for television event directors and camera operators. The present invention includes a camera having a field-of-view. A data processing system tracks an off-screen object. A coordinate manager blends an on-screen indication of distance that the object is away from said field-of-view. The camera is positioned to avoid the object in the field-of-view.

The above, as well as additional purposes, features, and advantages of the present invention will become apparent in the following detailed written description.

BRIEF DESCRIPTION OF THE FIGURES

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying figures, wherein:

DETAILED DESCRIPTION OF AN EMBODIMENT

Figure 1:
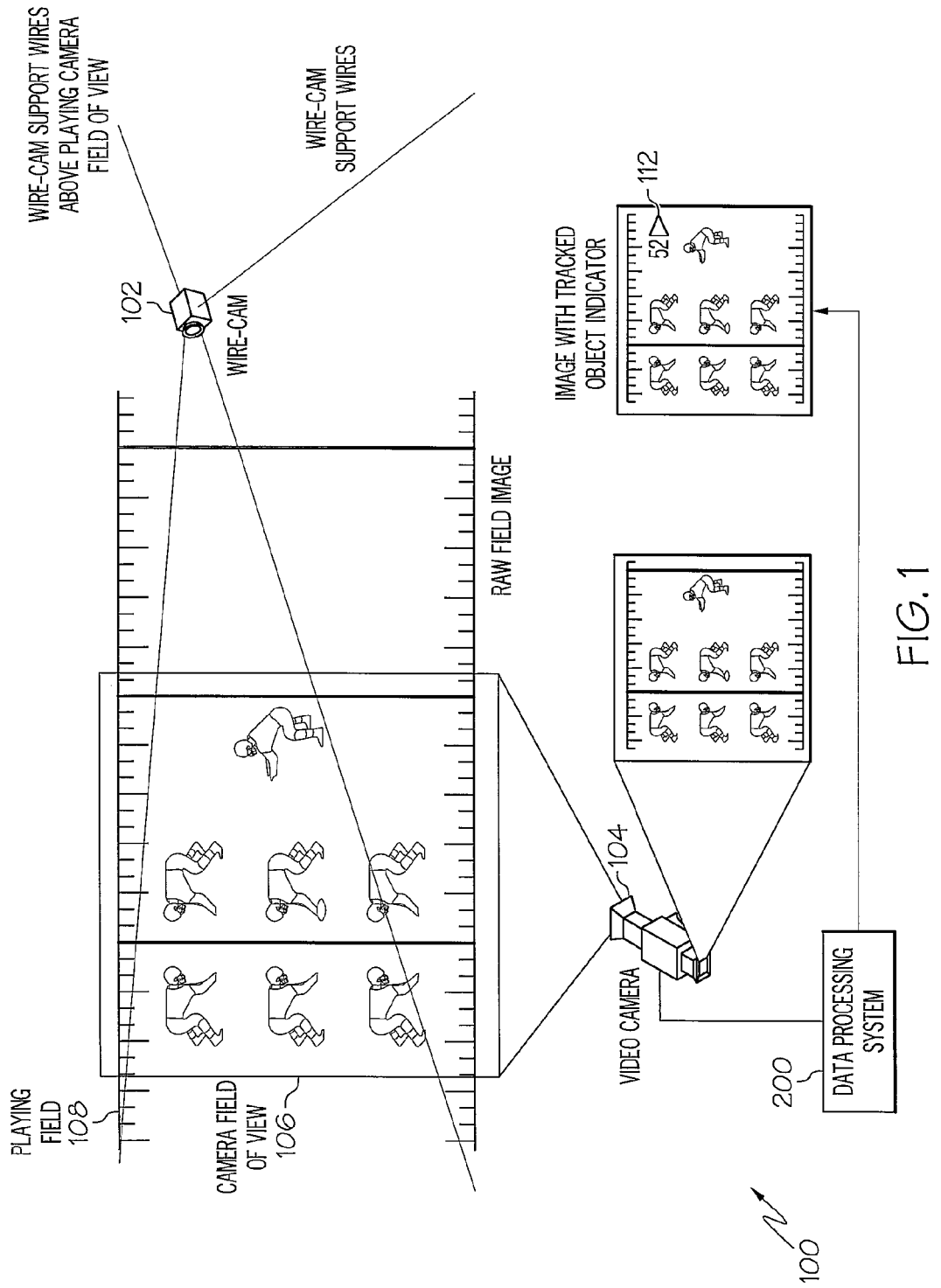
FIG. 1 illustrates an exemplary system in which an embodiment of the present invention may be implemented.

Referring now to the figures, and in particular, referring to FIG. 1, there is depicted an exemplary system 100 in which an embodiment of the present invention may be implemented. As illustrated, exemplary system 100 may be implemented to enable a live television remote broadcast of an American football game. As well-known in the art, a "remote broadcast" or "outside broadcast" is a broadcast of an event done from a location away from a regular television or radio studio. While an embodiment of the present invention relates to a live television remote broadcast of an American football game, those with skill in the art will appreciate that the present invention may be utilized in both live or recorded broadcasts of any event.

Exemplary system 100 includes a wire camera 102, video camera 104, and data processing system 200. Wire camera 102 is a type of remote camera that enables a camera operator to record events from locations that the camera operator may not be physically able to access. Wire camera 102 also offers viewers a different perspective of playing field 108 from that of video camera 104. As shown, wire camera 102 transmits an overhead perspective of playing field 108. Wire camera 102 is mounted over playing field 108 via a set of safety cables and may be controlled remotely via hand triggers, radio transmitters, or a built-in self-timer. According to an embodiment of the present invention, a camera operator controls wire camera 102 via a radio transmitter. Wire camera 102 also sends images and present location coordinates to coordinate manager 230 (FIG. 2) stored within system memory 206 (FIG. 2) of data processing system 200 for processing. Wire camera 102 is coupled to data processing system 200 via any wired or wireless connection.

As illustrated, video camera 104 is positioned to capture a side view of playing field 108 and sends the images and any object tracking coordinates to data processing system 200. In an embodiment of the present invention, assume for the purposes of discussion, that the live television remote broadcast includes at least a director, a sound engineer, and at least one camera operator. The director observes the raw feeds from multiple cameras and selects the view that he or she believes to be the most appropriate view for the live broadcast.

In an embodiment of the present invention, the director can designate certain objects for tracking purposes. Once certain objects (e.g., football, a certain player, wire camera 102, and the like) are designated for tracking (hereinafter a "tracked object"), cameras (e.g., video camera 104 or wire camera 102) send coordinates of the designated objects to coordinate manager 230 (FIG. 2) in system memory 206 of data processing system 200. The coordinates represent a present position of an object designated for a tracked object. Coordinate manager 230 receives coordinates via network interface card 216 and processes the coordinates to determine the current position of tracked objects. Those with skill in the art will appreciate that coordinate manager 230 may utilize any type of tracking system including, but not limited to: global positioning systems (GPS), spatial-coordinate systems, positional sensors mounted on the tracked object, and the like.

Those with skill in the art will appreciate that a director may desire certain objects to be shown on a television broadcast. For example, the director may be more interested in keeping the location of the football in the field of view (e.g., field of view 106), while minimizing the time that wire camera 102 spends in the field-of-view of other cameras in system 100. The director can designate objects as "desirable" or "undesirable" objects. Hereinafter, a "desirable" object is an object that the director may want to be on-screen in the live broadcast whenever possible (e.g., a football or a certain star player in a football game). An "undesirable" object is an object that the director may want to exclude from the live broadcast whenever possible (e.g., wire camera 102 or some other distracting background element).

For example, assume for exemplary purposes that the director has designated both the football and wire camera 102 as tracked objects. Further, the director has designated the football as a "desirable" object, whereas wire camera 102 is designed as an "undesirable" object. As discussed herein in more detail in conjunction with FIGS. 3 and 4, coordinate manager 230 displays indicia to indicate the distance and location of a tracked object. For example, coordinate manager 230 overlays indicia 112 over a raw feed image from video camera 104 to indicate the direction and distance of a tracked object (e.g., wire camera 102 in FIG. 1).

Those with skill in the art will appreciate that exemplary system 100 can include many additional components (e.g., monitors, microphones, recording equipment such as video tape, etc., sound boards and the like) not specifically illustrated in FIG. 1. Because such additional components are not necessary for an understanding of the present invention, they are not illustrated in FIG. 1 or discussed further herein.

Figure 2:
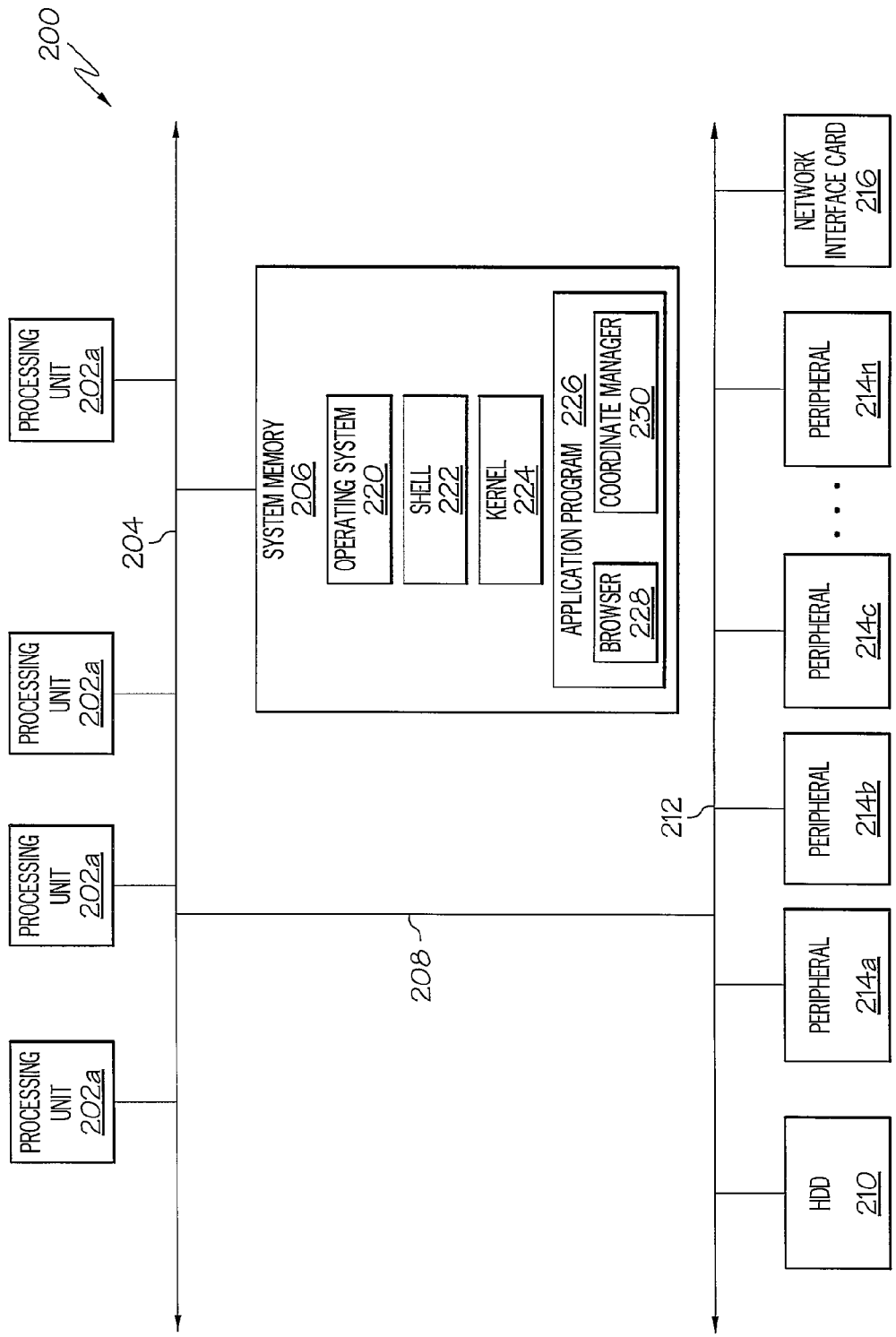
FIG. 2 depicts an exemplary data processing system as shown in FIG. 1, in accordance with an embodiment of the present invention.

With reference to FIG. 2, there is illustrated an exemplary data processing system 200 according to an embodiment of the present invention. As illustrated, data processing system 200 includes a collections of processing units 202*a*-2*n*, which are coupled to system memory 206 via a system interconnect 204. System interconnect 204 is coupled to peripheral interconnect 212 via mezzanine interconnect 208. Those with skill in the art will appreciate that peripheral interconnect 212 may be implemented by any type of interconnect including, but not limited to: peripheral component interconnect (PCI) bus, advanced graphics port (AGP), small computer system interface (SCSI), etc. Coupled to peripheral interconnect 212 is a hard disk drive 210 for mass storage and a collection of peripherals 214*a*-214*n*, which may include, but are not limited to: optical drives, other hard disk drives, printers, input devices, etc. A network interface card (NIC) 216 enables data processing system 200 to communicate with As shown, system memory 206 includes operating system 220, which further includes shell 222 for providing transparent user access to resources such as application programs 226. Generally, shell 222 is a program that provides an interpreter and an interface between the user and the operating system. More specifically, shell 222 (as it is called in UNIX®) executes commands that are entered into a command line user interface or a file. Thus, shell 222, also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., kernel 224) for processing. Note that while shell 222 is a text-based, line-oriented user interface, the present invention will support other user interface modes, such as graphical, voice, gestural, etc. equally well.

As illustrated, operating system 220 also includes kernel 224, which includes lower levels of functionality for operating system 220 and application programs 226, including memory management, process and task management, disk management, and mouse and keyboard management. Application programs 226 can include a browser 228, utilized for access to the Internet, world processors, spreadsheets, and other application programs. Also, system memory 206 includes coordinate manager 230, which processes coordinates of tracked objects and displays tracked object indicators (e.g., indicia 112 of FIG. 1), as discussed herein in more detail in conjunction with FIGS. 3A-3D and 4.

Those with skill in the art will appreciate that data processing system 200 can include many additional components not specifically illustrated in FIG. 2. Because such additional components are not necessary for an understanding of the present invention, they are not illustrated in FIG. 2 or discussed further herein. It should be understood, however, that the enhancements to data processing system 200 provided by the present invention are applicable to data processing systems of any system architecture and are in no way limited to the generalized multi-processor architecture or symmetric multi-processing (SMP) architecture illustrated in FIG. 2.

FIGS. 3A-3D are graphical user interfaces (GUIs) generated by coordinate manager 230 shown in FIG. 2, in accordance with an embodiment of the present invention. FIGS. 3A-3D illustrate various views generated by coordinate manager 230 and overlaid on a raw feed image from video camera 104, depending on whether or not a tracked object is seen in the field-of-view of video camera 104. Also, FIGS. 3A-3D are utilized in conjunction with the following discussion of FIG. 4.

Figure 4:
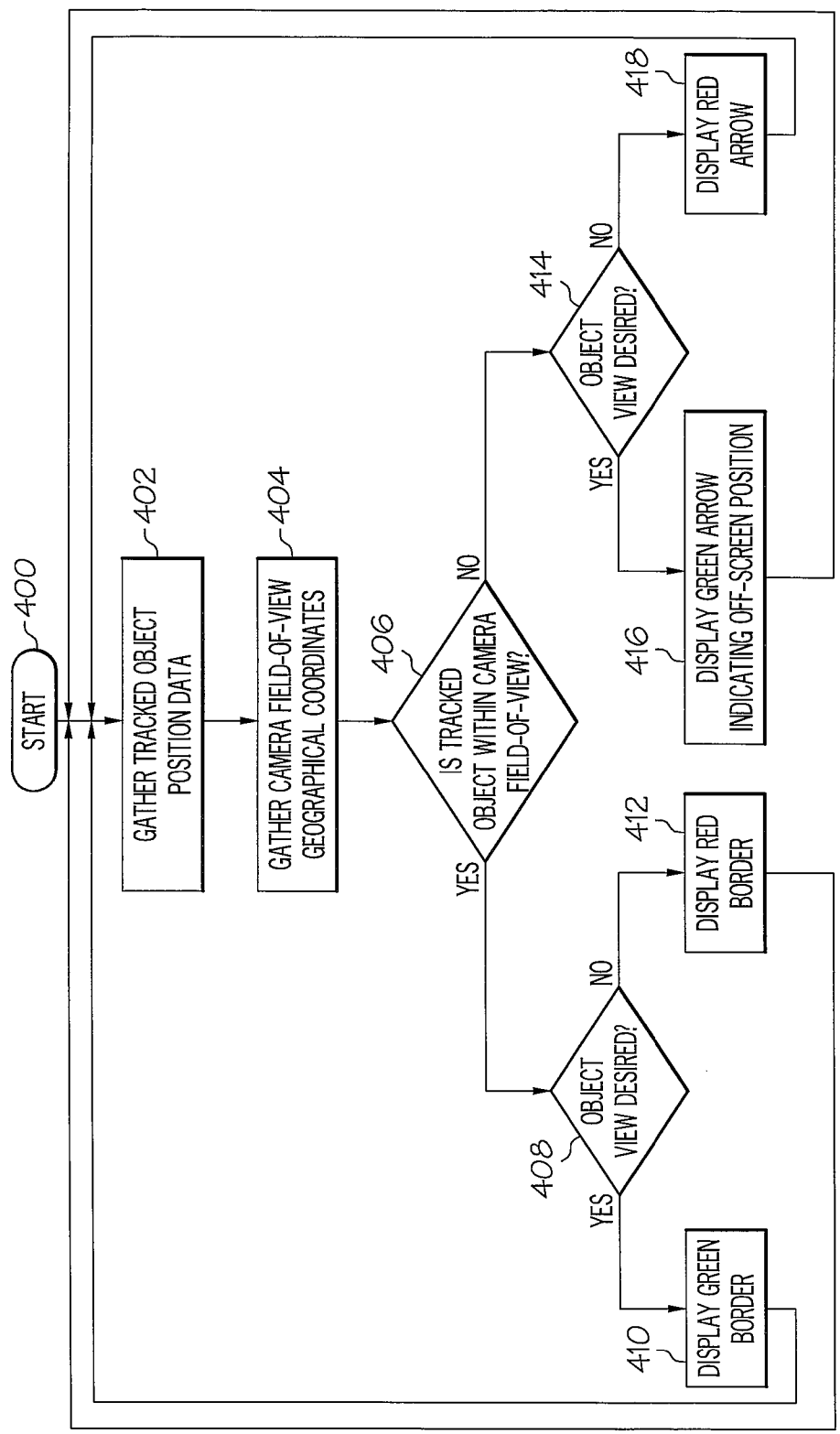
FIG. 4 is a high-level logical flowchart showing an exemplary method for implementing beyond field-of-view tracked object positional indicators for television directors and camera operators according to an embodiment of the present invention.

FIG. 4 is a high-level flowchart diagram showing an exemplary method implementing beyond field-of-view tracked object positional indicators for television event directors and camera operators. The process begins at step 400 and continues to step 402, which illustrates coordinate manager 230 gathering tracked object position data. In an embodiment of the present invention, a precise range of geographical coordinates within the field-of-view of a camera (e.g., wire camera 102 and video camera 104) can be determined. Hence, the location (in distance, direction, and speed terms) of the tracked objects (e.g., the football and/or wire camera 102 is sent from any camera in system 100 that has any tracked objects in its field-of-view. As previously discussed, the precise range of geographical coordinates of any tracked object may be determined by any coordinate system including, but not limited to: GPS, spatial-coordinate systems, cameras physically mounted on a tracked object, and the like.

The process continues to step 404, which depicts coordinate manager 230 gathering any camera field-of-view geographical coordinates, which define the geographical area that is visible in the field-of-view of any cameras in system 100. The process proceeds to step 406, which illustrates coordinate manager 230 determining if a tracked object is within a camera field-of-view.

If the tracked object is not within the camera field-of-view, the process continues to step 414, which depicts coordinate manager 230 determining if the tracked object is a desired object. If the tracked object is an undesirable object, coordinate manager 230 displays a red arrow indicating the off-screen position overlaid on the field-of-view display to indicate the distance and direction of the desired object, as illustrated in step 418 and FIG. 3A. In this case, the undesirable object, wire camera 102 is not within the field-of-view of video camera 104. Coordinate manager 230 overlays a red arrow indicating the location of distance of the undesirable object over the feed from video camera 104. Then, the process returns to step 402.

Figure 3A:
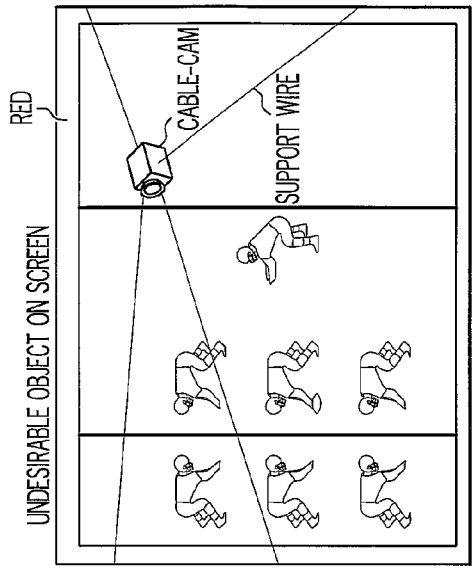
FIGS. 3A-3D are graphical user interfaces (GUIs) illustrating the output of a coordinate manager as shown in FIG. 2, in accordance with an embodiment of the present invention.
Figure 3C:
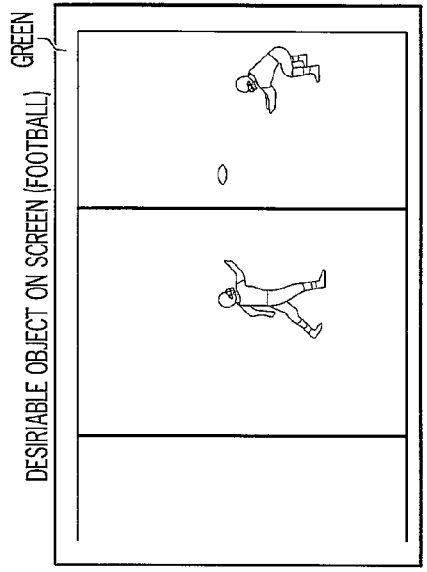
Figure 3B:
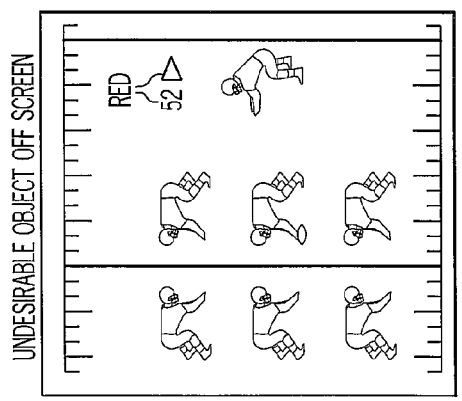

Returning to step 414, if the track object is a desirable object, coordinate manager 230 displays a green arrow indicating the off-screen position overlaid on the field-of-view display to indicate the distance and direction of the undesired object, as illustrated in step 416 and in FIG. 3B. The process then returns to step 402.

Figure 3D:
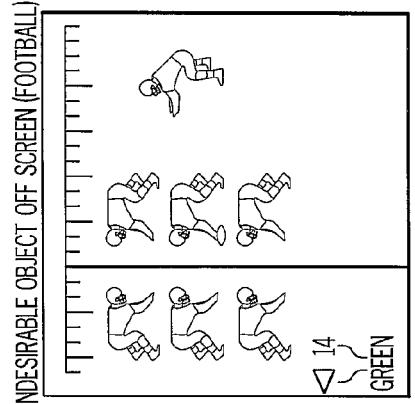

Returning to step 406, if a tracked object is within the field-of-view of video camera 104, the process continues to step 408, which depicts coordinate manager 230 determining if the tracked object is a desirable or an undesirable object. If the tracked object is a desirable object, the process continues to step 410, which illustrates coordinate manager 230 displaying a green border overlaid on the field-of-view display of video camera 104, as illustrated in FIG. 3D. The process returns to step 402.

Returning to step 408, if the tracked object is an undesirable object, the process continues to step 412, which shows coordinate manager 230 displaying a red border overlaid on the field-of-view display of video camera 104, as illustrated in FIG. 3C. The process returns to step 402.

As discussed, the present invention includes a system and method for implementing beyond field-of-view tracked object positional indicators for television event directors and camera operators. The present invention includes a camera having a field-of-view. The camera tracks an off-screen object. A coordinate manager blends an on-screen indication of distance that the object is away from said field-of-view. The camera is positioned to avoid the object in the field-of-view.

It should be understood that at least some aspects of the present invention may be alternatively be implemented in a computer-usable medium that contains a program product. Programs defining functions in the present invention can be delivered to a data storage system or a computer system via a variety of signal-bearing media, which include, without limitation, non-writable storage media (e.g., CD-ROM), writable storage media (e.g., hard disk drive, read/write CD-ROM, optical media), system memory such as, but not limited to random access memory (RAM), and communication media, such as computer networks and telephone networks, including Ethernet, the Internet, wireless networks, and like networks. It should be understood, therefore, that such signal-bearing media, when carrying or encoding computer-readable instructions that direct method functions in the present invention, represent alternative embodiments of the present invention. Further, it is understood that the present invention may be implemented by a system having means in the form of hardware, software, or a combination of software and hardware as described herein or their equivalent.

While the present invention has been particularly shown and described with reference to a preferred embodiment, it will be understood by those skilled in the art that various changes in form and detail may be made herein without departing from the spirit and scope of the invention.

What is claimed is:

1. A method for directing a video camera, said method comprising:
   selecting a plurality of objects to be tracked by a camera having a field-of-view, wherein a subset of said objects is designated as desirable objects and the remaining objects are designated as undesirable objects;
   obtaining positional data on said objects;
   obtaining geographical coordinates of said camera's field-of-view;
   determining whether or not one of said objects is within said camera's field-of-view based on said obtained positional data and said obtained geographical coordinates; and
   in a determination that one of said objects is within said camera's field-of-view, displaying a visual cue on a monitor to allow a user to quickly ascertain if said one object is a desirable or undesirable object.

2. The method of claim 1, wherein said displaying further includes displaying a green border when said one object is a desirable object.

3. The method of claim 1, wherein said displaying further includes displaying a red border when said one object is an undesirable object.

4. A data processing system comprising:
   a system memory for storing a selection of objects to be tracked by a camera having a field-of-view, wherein a subset of said objects is designated as desirable objects and the remaining objects are designated as undesirable objects;
   a network interface card, coupled to said system memory, for obtaining positional data on said objects and for obtaining geographical coordinates of said camera's field-of-view; and
   a processor, coupled to said system memory, for determining whether or not one of said objects is within said camera's field-of-view based on said obtained positional data and said obtained geographical coordinates; and
   a monitor, in a determination that one of said objects is within said camera's field-of-view, for displaying a visual cue to allow a user to quickly ascertain if said one object is a desirable or undesirable object.

5. The data processing system of claim 4, wherein said displaying further includes displaying a green border when said one object is a desirable object.

6. The data processing system of claim 4, wherein said displaying further includes displaying a red border when said one object is an undesirable object.

7. A non-transitory computer usable medium embodying computer program cod for directing a video camera, wherein said computer usable medium comprising:
   program code for defining a plurality of objects to be tracked by a camera having a field-of-view, wherein a subset of said objects is designated as desirable objects and the remaining objects are designated as undesirable objects;
   program code for obtaining positional data on said objects;
   program code for obtaining geographical coordinates of said camera's field-of-view;
   program code for determining whether or not one of said objects is within said camera's field-of-view based on said obtained positional data and said obtained geographical coordinates; and
   program code for, in a determination that one of said objects is within said camera's field-of-view, displaying a visual cue on a monitor to allow a user to quickly ascertain if said one tracked object is a desirable or undesirable object.

8. The computer-usable medium of claim 7, wherein said program code for displaying further includes program code for displaying a green border when said one object is a desirable object.

9. The computer-usable medium of claim 7, wherein said computer program code for displaying further includes program code for displaying a red border when said one object is an undesirable object.

* * * * *